United States Patent
Boss et al.

(10) Patent No.: US 8,234,016 B2
(45) Date of Patent: Jul. 31, 2012

(54) POWER METADATA TRANSFER OVER POWER LINES

(75) Inventors: Gregory J. Boss, American Fork, UT (US); James R. Doran, New Milford, CT (US); Rick A. Hamilton, II, Charlottesville, CA (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 1001 days.

(21) Appl. No.: 12/203,379

(22) Filed: Sep. 3, 2008

(65) Prior Publication Data

US 2010/0052872 A1    Mar. 4, 2010

(51) Int. Cl.
*G06F 1/26*      (2006.01)
*G06Q 10/08*      (2012.01)

(52) U.S. Cl. ........ 700/295; 700/286; 700/291; 705/412; 705/37; 705/26.41; 340/12.32; 340/870.02

(58) Field of Classification Search .................... 700/22, 700/36, 286, 291, 295, 297; 705/7.22, 26.1, 705/7.35, 7.36, 26.41, 37, 412; 340/12.32, 340/12.33, 538, 538.11, 870.07, 870.18, 340/870.02
See application file for complete search history.

(56) References Cited

U.S. PATENT DOCUMENTS

| | | |
|---|---|---|
| 6,598,029 B1 | 7/2003 | Johnson et al. |
| 6,631,309 B2 | 10/2003 | Boies et al. |
| 6,785,592 B1 | 8/2004 | Smith et al. |
| 7,171,287 B2 | 1/2007 | Weiss |
| 2002/0103655 A1* | 8/2002 | Boies et al. ................. 705/1 |
| 2004/0098142 A1* | 5/2004 | Warren et al. ............... 700/22 |
| 2004/0236633 A1* | 11/2004 | Knauerhase et al. ........ 705/26 |
| 2004/0254899 A1 | 12/2004 | Abe et al. |
| 2005/0165512 A1 | 7/2005 | Peljto |
| 2006/0190358 A1* | 8/2006 | Slik ............................. 705/27 |
| 2009/0003481 A1* | 1/2009 | Schopfer et al. ............ 375/260 |

* cited by examiner

*Primary Examiner* — George Bugg
*Assistant Examiner* — Anne Lai
(74) *Attorney, Agent, or Firm* — Patrick J. Daugherty; Driggs, Hogg, Daugherty & Del Zoppo Co., LPA

(57) ABSTRACT

The transfer and usage of a modulated carrier signal within a power signal on a power line communication system is described. The modulated signal comprises metadata which is transmitted at a different frequency than the transmitted power. The metadata, including such elements as energy costs, providers, renewable source status and originating location, may be used by consumers to make subsequent purchasing decisions. Additionally, the energy costs of any given computer node commonly distributed in a grid architecture may be collected by a workload dispatcher in order to make more accurate cost and energy source based dispatch decisions. The consumer may be able to communicate directly back to the power provider. The use of computer-readable medium and product containing instructions that are implemented on a computer is also covered. Finally, the invention may be deployed on behalf of the consumer by a third party service provider.

10 Claims, 2 Drawing Sheets

POWER METADATA TRANSFER OVER POWER LINES

FIELD OF THE INVENTION

The present invention relates to the provision of broadband internet service over power lines for use by consumers in making energy choices.

BACKGROUND OF THE INVENTION

Currently known in certain geographical locations are options for consumers to subscribe to "green energy". The term 'green energy' has been described as a source of energy which is considered to be environmentally friendly and non-polluting. Such a source may be solar, wind, biomass, or hydro energy. In many urban and rural areas with energy choices, consumers have the ability to obtain electricity from renewable sources, albeit often for a higher cost based upon the maturity of related technologies. Many consumers would be interested in having more options for selecting green energy sources. Additionally, consumers may also wish to select power based on geopolitical data about the provider and originating location for the energy source.

Power costs are a significant portion of the budget of an enterprise, especially for those managing data centers. Consumers are seeking ways to improve their profitability by reducing their power costs. It is evident that consumers such as industrial, residential, or commercial, lack reliable and up-to-date information about what is available to them in power markets at any given time. Currently, a consumer can only know what the published rates are from a point prior to the current time, typically on a monthly cycle. The power industry is rapidly moving towards a model that other industries, such as the stock market and fuel industry, have achieved, which involves dynamically changing prices for a commonly used commodity. For such an environment, there is only one method known today which could be used to understand what the current cost per unit of energy is for any specific location, and that would be publishing the rates on web accessible internet or private intranet where authorized consumers could look up the cost of the supplied energy. This is an inefficient and limiting method which if implemented would require an extreme amount of logistical coordination and updates. There exists, therefore, a need for a more efficient method of publishing data on cost, source, origination, etc. so that consumers can reliably and efficiently make energy consumption decisions.

Current means for dynamically communicating and selecting power providers based on costs and other criteria in a real-time manner are limited. A retail electricity market exists when end-use consumers can choose their supplier from competing electricity retailers. One term used for this type of consumer choice is 'energy choice'. A separate issue for electricity markets is whether or not consumers receive real-time pricing, that is, prices based on the variable wholesale price, or a price that is set in some other way, such as average annual costs. In many markets, consumers do not pay based on the real-time price, and hence have no incentive to reduce demand at times of high, wholesale, prices or to shift their demand to other periods. Demand response may use pricing mechanisms or technical solutions to reduce peak demand.

Generally, electricity retail reform follows from electricity wholesale reform. However, it is possible to have a single electricity generation company and still have retail competition. If a wholesale price can be established at a node on the transmission grid and the electricity quantities at that node can be reconciled, competition for retail consumers within the distribution system beyond the node is possible. In the German market, for example, large, vertically integrated utilities compete with one another for consumers on a more or less open grid.

SUMMARY OF THE INVENTION

For purposes of the present invention, power line communication (PLC), is one of the terms used to describe several different systems that exist for using electric power lines to carry information over power line. This invention may utilize any known or future methods of transmitting data over power lines, including medium and high frequency communication.

This invention relates to methods and systems for the transfer and usage of power metadata within the power signal itself. Metadata, including such elements as cost, provider, renewable source status, originating location, may be used by consumers to make subsequent purchasing decisions. Additionally, the energy costs of any given computer node commonly distributed in a grid architecture can be collected by a workload dispatcher in order to make more accurate cost and energy source based dispatch decisions. The steps of the invention comprise converting the power rate information into the form of metadata. Then, the metadata is sent on the transmission route to an endpoint recipient. A signal decoder is then used to enable the recipient to read the information. The recipient can then respond back to the provider through the metadata transmission link, or through an independent loop.

The invention also relates to a computer-readable medium containing instructions that are implemented on a computer for the transfer and usage of the metadata within the power signal.

In addition, the invention relates to a computer product including a medium on which a computer program is recorded, said computer program including:

A first set of instructions for converting the power rate information into metadata;

A second set of instructions for transmitting the metadata on the transmission route to an endpoint recipient, such as an energy provider or broker; and A third set of instructions for providing a signal decoder to enable the recipient to read the information.

Finally, the invention relates to a method for deploying a service provider to implement the operative steps of the present invention on behalf of a consumer.

BRIEF DESCRIPTION OF THE DRAWINGS

These and other features of this invention will be more readily understood from the following detailed description of the various aspects of the invention taken in conjunction with the accompanying drawings in which.

The drawings are not intended to be drawn to scale. Instead, the drawings are merely a schematic representation, not intended to portray specific parameters of the invention. The drawings are intended to depict only typical embodiments of the invention and, therefore, should not be considered as limiting the scope of the invention.

DETAILED DESCRIPTION OF THE INVENTION

This invention discloses the sending of power metadata over the power signal for dynamic cost calculation and provider selection. For purposes of the present invention, power is defined as an energy resource, such as electricity used by businesses and individual consumers over a given unit of time. All power line communication systems operate by impressing a modulated carrier signal on the wiring system. Different types of power line communications use different frequency bands, depending on the signal transmission characteristics of the power wiring used. Low-frequency (about 100-200 kHz) carriers impressed on high-voltage transmission lines may carry one or two analog voice circuits, or telemetry and control circuits with an equivalent data rate of a few hundred bits per second; however, these circuits may be many miles (kilometers) long. High frequency (6-80 MHz) has much higher data rates in excess of 1 Gbits per second, but only over considerably shorter distances.

Figure 1:
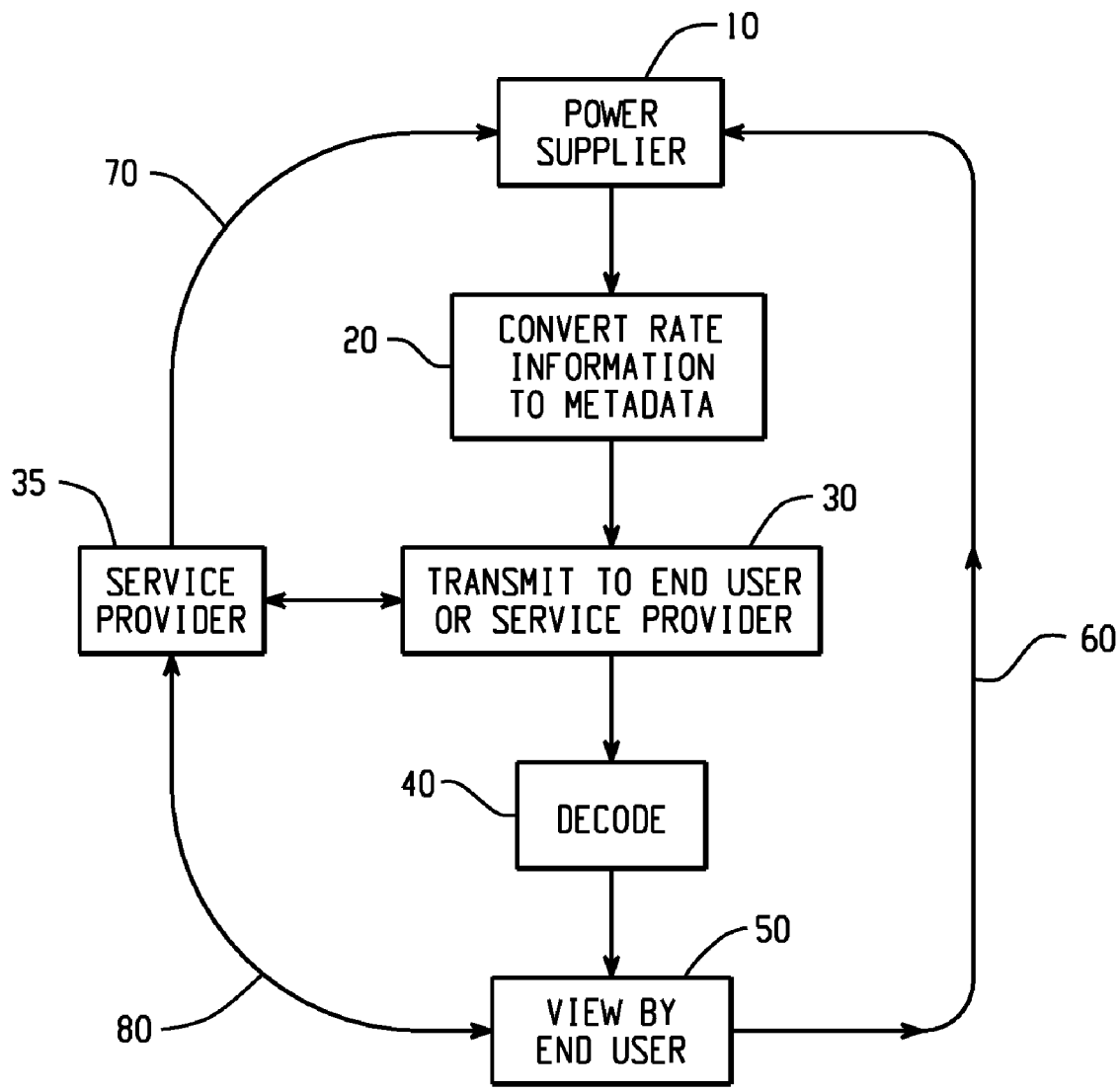
FIG. 1 is a flow diagram showing the key operative steps of the present invention.

The flow diagram of FIG. 1 shows a typical power supplier 10, such as an electrical power plant, or an electric grid. The supplier has a need or willingness to communicate power consumption costs or other information to selected consumers or to all of its consumers. The supplier first converts, or arranges for the conversion, of such information to metadata at 20 using conversion equipment and software that is customarily used in the art. This metadata is transmitted to an end user 30 where the metadata is converted into usable form, such as with a decoder at 40. Decoders for this purpose are readily available. Then, the information is viewed at 50 by the end user who may then transmit a response back to the power supplier either along the same line on which the metadata was conveyed to the end user, or along a separate line 60. Alternatively, the information may be viewed by a service provider 35 who then communicates with the end user along line 80. Then either the service provider 35 sends a response to the power supplier 10 along line 70, or the end user transmits the response to the power supplier along line 60.

The following lists some of the attributes of power that may be included in such a transmission to the end user:
  Cost of power
  Provider name and/or unique provider identifier
  Geographic source of generation (e.g., ABC plant in SampleTown, NY)
  Geographic source(s) of raw materials (e.g., bituminous coal: 82% Pennsylvania origin, 18% West Virginia origin)
  Methods used to generate, such as solar, wind turbine, renewable sources, or coal
  Maximum amount available
  Duration of time the current rate will be available
Note that, within the bounds of the present invention, some of these fields and corresponding data values may be omitted and others may be added as needed.

Advertisement of rates may be offered in a controlled manner, to prevent exceeding provider capacity and also to offer preferential pricing.

This invention discloses metadata describing the power to be sent over the power signal. It may utilize any known or future methods of providing data over a power line. It provides for an open forum where any provider may post its power rates so long as that provider has access to provide power on the grid in question, allowing large corporations or other consumers to make choices.

With this grid, each consumer knows the cost/unit as it is using power and amount available at that price point. This enables awareness of power cost and other attributes in a distributed environment. However, this may or may not reflect anything similar to today's web browsers. Instead, it may represent a "get data as needed" function for obtaining the desired information.

Among the strategies for sending and receiving metadata over power lines are the following:

(1) Metadata describing the power itself is sent along the power line at a different frequency than the transmitted power. A device is placed into each endpoint (home, business data center, etc.) that wishes to use the metadata. This device measures the higher frequency signals which are sent along with the power. In the preferred embodiment, the metadata signal is sent constantly and can be read by the endpoint recipients at any given time, or constantly if so desired. Once the end point recipients read the data, actions can be taken as described below.

(2) Independent of whether a full internet connection is available through the utility line, a news ticker-like flow of information would present the relevant fields to some form of software/hardware collection point (e.g., workload dispatcher) on the consumer site. This crawler would present these fields for service providers available to the consumer, updated periodically, at regular intervals so that consumer could choose accordingly.

(3) A microcosm of internet-like functionality could be provided, such that a hardware/software unit (e.g., workload dispatcher) could access data "as needed" in a look-up method analogous to today's http requests.

The concepts of high-speed communications are applied over the power grid, to offer data minute-by-minute, or hour-by-hour power rates between all providers. Similarly, consumers such as data centers, businesses or individuals, may then return over the same in-band mechanisms, a response with their choice of energy provider.

Rates and other metadata may be provided in a continuous, repeating stream or on set intervals.

Additionally, this invention considers the maximum capacity of a given service provider to ensure that the provider's capacity threshold is not exceeded. For example, if XYZ Energy suddenly advertises the cheapest rates, then everyone may rush to Acme Energy. Acme would obviously not be able to meet all those needs. Thus, the necessity of an upper boundary is seen. Prenegotiated Quality of Service (QoS) contracts may determine which consumers are preferred and get first priority at the lower rates.

Rates may be advertised in a phased manner, as shown in the following scenario:
  1. First tier platinum consumers are offered the low rate for the first hour;
  2. If capacity is still available, the next tier gold consumers are offered the price for two hours;
  3. If capacity is still available, the low price is now opened up to all consumers Computerized Implementation Referring now to FIG. 2, an exemplary computerized implementation 100 of the invention includes a computer 104 deployed within a computer infrastructure 108 such as one existing at the information technology center of a business firm, a manufacturing company, or governmental agency. The computer infrastructure 108 receives input from the power supplier 10. The input is processed and is transmitted to one or more end users (consumers) 50. The end user then has the ability to transmit directly to the power supplier 10 along route 60 (see FIG. 1), through a service provider 35, or back through the computer infrastructure 108.

Figure 2:
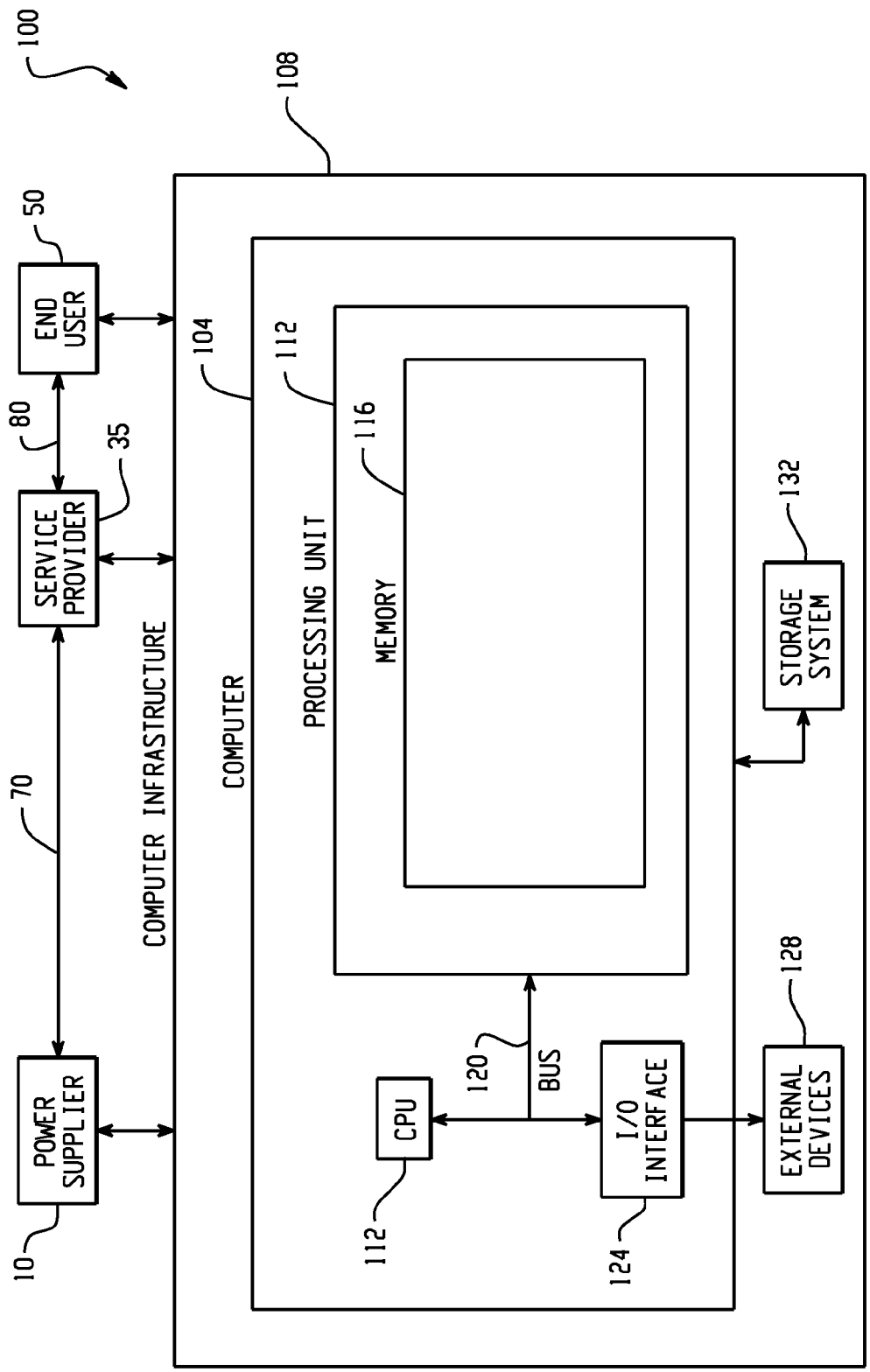
FIG. 2 is a block diagram illustrating an exemplary computerized system and method for implementing the present invention.

This FIG. 2 is intended to demonstrate, among other things, that the present invention could be implemented within a network environment (e.g., the Internet, a wide area network (WAN), a local area network (LAN), a virtual private network (VPN), etc.), or on a stand-alone computer.

In the case of the network environment, communication throughout the network can occur via any combination of various types of communication links. For example, the communication links can comprise addressable connections that may utilize any combination of wired and/or wireless transmission methods.

As shown, a computer system 100 comprises a computer 104 within a computer infrastructure 108. The computer 104 includes a processing unit 112, a memory 116, a bus 120, and input/output (I/O) interfaces 124. Further, the computer 104 is shown in communication with external I/O devices/resources 128 and storage system 132. In general, the processing unit 112 executes computer program code, such as the code to implement various components of the computer 104, which is stored in memory 116 and/or storage system 132. It is to be appreciated that two or more, including all, of these components may be implemented as a single component.

While executing computer program code, the processing unit 112 can read and/or write data to/from the memory 116, the storage system 132, and/or the I/O interfaces 124. The bus 120 provides a communication link between each of the components in the computer 104. The external devices 128 can comprise any devices (e.g., keyboard, pointing device, display, etc.) that enable a user to interact with the computer 104 and/or any devices (e.g., network card, modem, etc.) that enable the computer 104 to communicate with one or more other computing devices.

The computer infrastructure 108 is only illustrative of various types of computer infrastructures for implementing the invention. For example, in one embodiment, computer infrastructure 108 comprises two or more computing devices (e.g., a server cluster) that communicate over a network to perform the various process steps of the invention. Moreover, the computer 104 is only representative of various possible computers that can include numerous combinations of hardware.

To this extent, in other embodiments, the computer 104 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively.

Moreover, the processing unit 112 may comprise a single processing unit, or be distributed across one or more processing units in one or more locations, for example, on a client site or on a server. Similarly, the memory 116 and/or the storage system 132 can comprise any combination of various types of data storage and/or transmission media that reside at one or more physical locations.

Further, I/O interfaces 124 can comprise any system for exchanging information with one or more of the external device 128. Still further, it is understood that one or more additional components (e.g., system software, math co-processing unit, etc.) not shown in FIG. 2 can be included in computer 104. However, if the computer 104 comprises a handheld device or the like, it is understood that one or more of the external devices 128 (e.g., a display) and/or the storage system 132 could be contained within the computer 100, not externally as shown.

The storage system 132 can be any type of system (e.g., a database) capable of providing storage for information under the present invention. To this extent, the storage system 132 could include one or more storage devices, such as a magnetic disk drive or an optical disk drive. In another embodiment, the storage system 132 includes data distributed across, for example, a local area network (LAN), wide area network (WAN) or a storage area network (SAN) (not shown). In addition, although not shown, additional components, such as cache memory, communication systems, system software, etc., may be incorporated into the computer 104.

In the illustrated embodiment, the computer 104 communicates with external devices 128 such as an external system communicating with the controller 112 over a path which may be a wired bus 120 (as shown) or wireless.

While shown and described herein as a method and a system, it is understood that the invention further provides various alternative embodiments. For example, in one embodiment, the invention provides a computer-readable/useable medium that includes computer program code to enable a computer infrastructure to perform the process steps of the invention. To this extent, the computer-readable/useable medium includes program code that implements each of the various process steps of the invention.

It is understood that the terms "computer-readable medium" or "computer useable medium" comprise one or more of any type of physical embodiment of the program code. The medium contains instructions for converting power-related information into a metadata format and transmitting the metadata over transmission route to be read by a recipient. In particular, the computer-readable/useable medium can comprise program code embodied on one or more portable storage articles of manufacture such as a compact disc, a magnetic disk, or a tape. Alternatively, or in addition, the code can be embodied on one or more data storage portions of a computing device, such as the memory 116 and/or the storage system 132 such as a fixed disk, a read-only memory, a random access memory, or a cache memory. The program code can be a data signal (e.g., a propagated signal) traveling over a network, such as during a wired/wireless electronic distribution of the program code.

In another embodiment, the invention provides a business method that performs the process steps of the invention on a subscription, advertising, and/or fee basis. That is, a service provider 35 could offer to manage the computer 104 to convert power-related information into metadata and to transmit the data for use by an end user 35. Furthermore, wireless or wired transmission 70 occurs between the service provider 35 and the power supplier 10. The metadata and/or instructions and feed back are routed along 80 between the service provider 35 and the end user 50. In this case, the service provider 35 can create, maintain, and support a computer infrastructure, such as the computer infrastructure 108 that performs the process steps of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for executing the computer 104. In this case, a computer infrastructure, such as computer infrastructure 108, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 100, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation, and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A system, comprising:
   a converter that converts power information into metadata and sends the metadata over a power transmission line with electricity transmitted over the power transmission line to a plurality of different recipient customers of the electricity, wherein the power information describes a current rate cost of the electricity that is charged by a provider offering the electricity; and
   a plurality of signal decoders that are each accessible by the recipient customers and that collect the metadata from the power transmission line, decode the collected metadata into the power information, and present the current rate cost of the electricity and a duration of time that the rate costs will be available to the recipient customers of the electricity by:
      offering a first tier plurality of the recipient customers the electricity at the current rate cost for a first time period;
      if capacity is still available within a maximum capacity of the electricity provider after expiration of the first time period, offering a different, second tier plurality of the recipient customers the electricity at the current rate cost for a second time period; and
      if capacity is still available within the maximum capacity of the electricity provider after expiration of the second time period, offering the current rate cost to a remainder of the plurality of the recipient customers;
   wherein the converter modulates the metadata into a carrier frequency that is different than a carrier frequency of the electricity transmitted over the power transmission line; and
   wherein said power information further comprises:
   a geographic location of a plant source of generation of the electricity;
   a method used by the plant source to generate the electricity; and
   a geographic source of raw materials if the raw materials are used by the method used by the plant source to generate the electricity.

2. The system according to claim 1, wherein the power information further comprises information that the method used by the plant source to generate the electricity is selected from a plurality of methods comprising solar, wind turbine, renewable sources and coal methods.

3. A method for transmitting power information between a power supplier and a recipient, the method comprising:
   converting power information into metadata;
   sending the metadata over a power transmission line with electricity transmitted over the power transmission line to a plurality of different endpoint recipients of the electricity by modulating the metadata into a carrier frequency that is different than a carrier frequency of the electricity transmitted over the power transmission line, wherein the power information describes a current rate cost of the electricity that is charged by a provider offering the electricity;
   collecting the metadata from the power transmission line;
   decoding the collected metadata into the power information; and
   presenting the current rate cost of the electricity and a duration of time that the rate cost will be available to the recipient customers of the electricity by:
      offering a first tier plurality of the recipient customers the electricity at the current rate cost for a first time period;
      if capacity is still available within a maximum capacity of the electricity provider after expiration of the first time period, offering a different, second tier plurality of the recipient customers the electricity at the current rate cost for a second time period; and
      if capacity is still available within the maximum capacity of the electricity provider after expiration of the second time period, offering the current rate cost to a remainder of the plurality of the recipient customers; and
   wherein said power information further comprises:
   a geographic location of a plant source of generation of the electricity;
   a method used by the plant source to generate the electricity; and
   a geographic source of raw materials if the raw materials are used by the method used by the plant source to generate the electricity.

4. The method according to claim 3, wherein the power information further comprises information that the method used by the plant source to generate the electricity is selected from a plurality of methods comprising solar, wind turbine, renewable sources and coal methods.

5. The method according to claim 3 wherein the metadata is delivered by a service provider whereby the data is available for viewing by a consumer.

6. The method according to claim 5 further wherein the consumer responds through the service provider to the power supplier.

7. An article of manufacture, comprising:
   a tangible computer readable tangible storage device having computer readable program code embodied therewith, the computer readable program code comprising instructions that, when executed on a computer system processing unit, cause the processing unit to:
   convert power information into metadata;
   transmit the metadata over a power transmission line with electricity transmitted over the power transmission line to a plurality of different endpoint recipients of the electricity by modulating the metadata into a carrier frequency that is different than a carrier frequency of the electricity transmitted over the power transmission line, wherein the power information describes a current rate cost of the electricity that is charged by a provider offering the electricity to endpoint recipients; and present the current rate cost of the electricity and a duration of time that the rate cost will be available to the recipient customers of the electricity by:
 offering a first tier plurality of the recipient customers the electricity at the current rate cost for a first time period;
 if capacity is still available within a maximum capacity of the electricity provider after expiration of the first time period, offering a different, second tier plurality of the recipient customers the electricity at the current rate cost for a second time period; and
 if capacity is still available within the maximum capacity of the electricity provider after expiration of the second time period, offering the current rate cost to a remainder of the plurality of the recipient customers; and
wherein said power information further comprises:
a geographic location of a plant source of generation of the electricity;
a method used by the plant source to generate the electricity; and
a geographic source of raw materials if the raw materials are used by the method used by the plant source to generate the electricity.

8. The article of manufacture according to claim 7, wherein the power information further comprises information that the method used by the plant source to generate the electricity is selected from a plurality of methods comprising solar, wind turbine, renewable sources and coal methods.

9. A system, comprising:
a processing unit, a computer readable memory and a tangible computer-readable device wherein the processing unit, when executing program instructions stored on the tangible computer-readable storage device via the computer readable memory:
converts the power information into metadata;
transmits the metadata over a power transmission line with electricity transmitted over the power transmission line to a plurality of different endpoint recipients of the electricity by modulating the metadata into a carrier frequency that is different than a carrier frequency of the electricity transmitted over the power transmission line, wherein the power information describes a current rate cost of the electricity that is charged by a provider offering the electricity to the endpoint recipients; and
presents the current rate cost of the electricity and a duration of time that the rate cost will be available to the recipient customers of the electricity by:
 offering a first tier plurality of the recipient customers the electricity at the current rate cost for a first time period;
 if capacity is still available within a maximum capacity of the electricity provider after expiration of the first time period, offering a different, second tier plurality of the recipient customers the electricity at the current rate cost for a second time period; and
 if capacity is still available within the maximum capacity of the electricity provider after expiration of the second time period, offering the current rate cost to a remainder of the plurality of the recipient customers; and
wherein said power information further comprises:
a geographic location of a plant source of generation of the electricity;
a method used by the plant source to generate the electricity; and
a geographic source of raw materials if the raw materials are used by the method used by the plant source to generate the electricity.

10. The system according to claim 9, wherein the power information further comprises information that the method used by the plant source to generate the electricity is selected from a plurality of methods comprising solar, wind turbine, renewable sources and coal methods.

* * * * *